United States Patent
Franke-Maintz et al.

(10) Patent No.: US 8,419,993 B2
(45) Date of Patent: Apr. 16, 2013

(54) EXTRUSION BLOW MOLDING MACHINE AND METHOD FOR THE PRODUCTION OF A HOLLOW PLASTIC BODY

(75) Inventors: Matthias Franke-Maintz, Hennef (DE); Klaus Maier, Lohmar (DE); Frank Pritz, Roth (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 434 days.

(21) Appl. No.: 12/665,832

(22) PCT Filed: May 6, 2008

(86) PCT No.: PCT/EP2008/003598
§ 371 (c)(1),
(2), (4) Date: Jun. 14, 2010

(87) PCT Pub. No.: WO2008/154987
PCT Pub. Date: Dec. 24, 2008

(65) Prior Publication Data
US 2010/0252964 A1     Oct. 7, 2010

(30) Foreign Application Priority Data
Jun. 20, 2007   (DE) .................. 10 2007 028 882

(51) Int. Cl.
  *B29C 69/00*   (2006.01)
  *B29C 49/42*   (2006.01)
(52) U.S. Cl.
  USPC ........... 264/250; 264/545; 425/516; 425/519

(58) Field of Classification Search ............ 425/516, 425/519, 522, 532, 534; 264/250, 515, 545
See application file for complete search history.

(56) References Cited

U.S. PATENT DOCUMENTS

| | | | |
|---|---|---|---|
| 6,866,812 B2 | 3/2005 | Van Schaftingen et al. | |
| 7,175,791 B2 | 2/2007 | Pappert et al. | |
| 2001/0009703 A1* | 7/2001 | Toshikawa | 264/515 |
| 2002/0105115 A1 | 8/2002 | Sadr | |
| 2008/0061470 A1* | 3/2008 | Borchert et al. | 264/250 |
| 2010/0282759 A1* | 11/2010 | Eckhardt et al. | 264/545 |

FOREIGN PATENT DOCUMENTS

DE     202006013751 U1   11/2006
(Continued)

OTHER PUBLICATIONS

International Search Report dated Sep. 8, 2008 issued in PCT Patent Application No. PCT/EP2008/003598, 6 pages.

(Continued)

*Primary Examiner* — Robert B Davis
(74) *Attorney, Agent, or Firm* — Grossman Tucker Perreault & Pfleger, PLLC

(57) ABSTRACT

The invention relates to an extrusion blow molding machine (1) with at least one extrusion head (2) and with at least two sheet dies (3), arranged next to one another, for the extrusion of sheet-like plastic preforms (4), with a multipart molding die (5) for processing two preforms into an essentially closed hollow body, having a device for handling the preforms (4). The device for handling the preforms comprises at least two grippers (10), arranged next to one another on a common carrier (8), for receiving the preforms (4), the distance between the grippers (10) being variable.

8 Claims, 4 Drawing Sheets

FOREIGN PATENT DOCUMENTS

Figure 4:
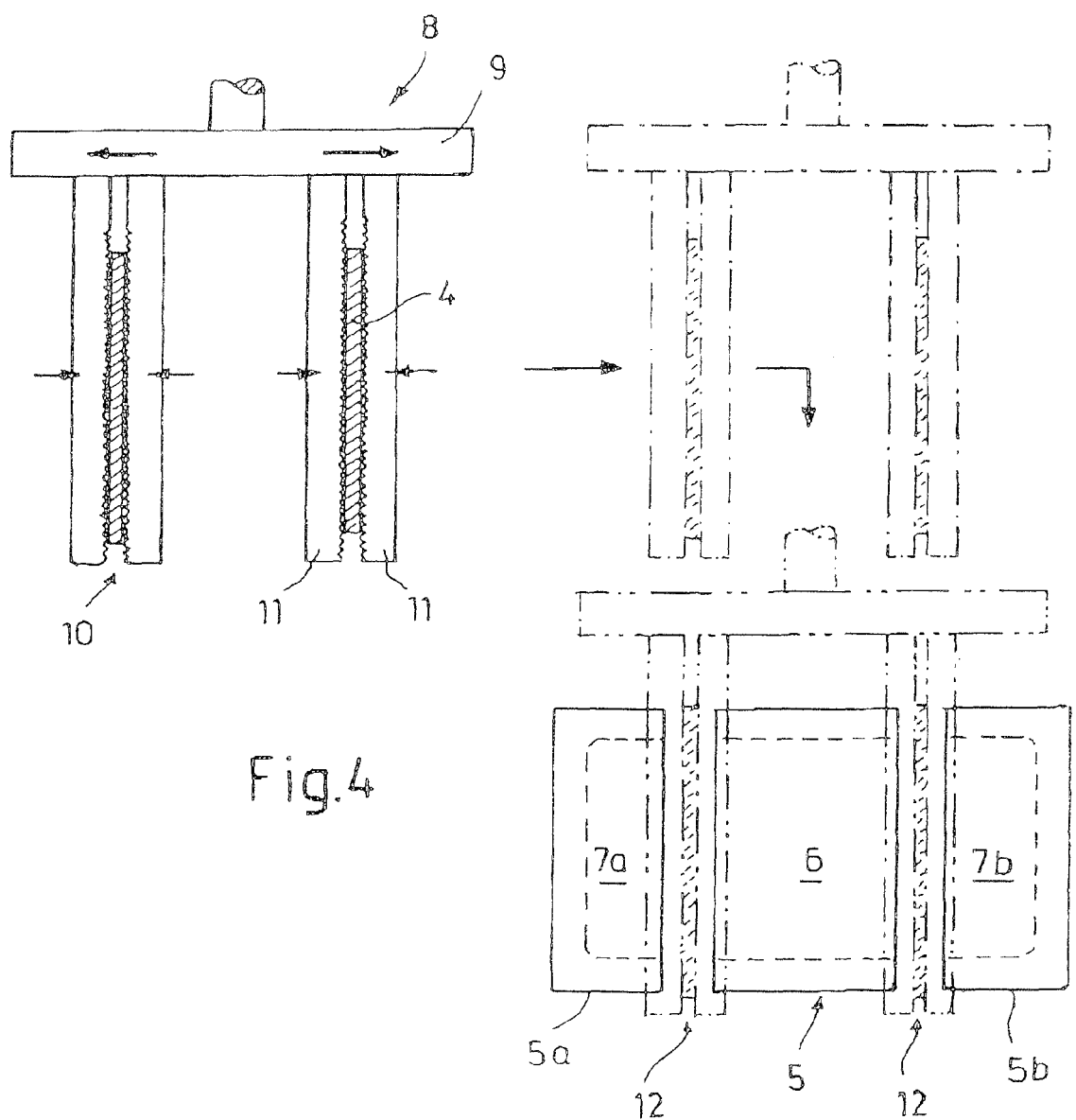

| | | |
|---|---|---|
| GB | 1410215 | 10/1975 |
| JP | 60125633 | 7/1985 |
| JP | 02081621 | 3/1990 |
| JP | 09001640 | 1/1997 |
| JP | 2006068930 A * | 3/2006 |

OTHER PUBLICATIONS

International Preliminary Report on Patentability dated Jan. 21, 2010 issued in PCT Patent Application No. PCT/EP2008/003598, 10 pages.

* cited by examiner

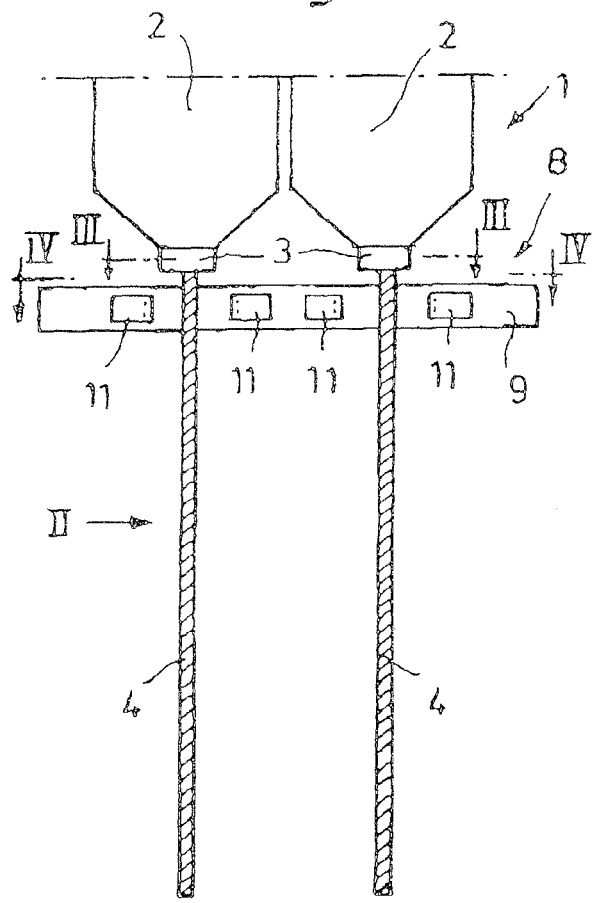
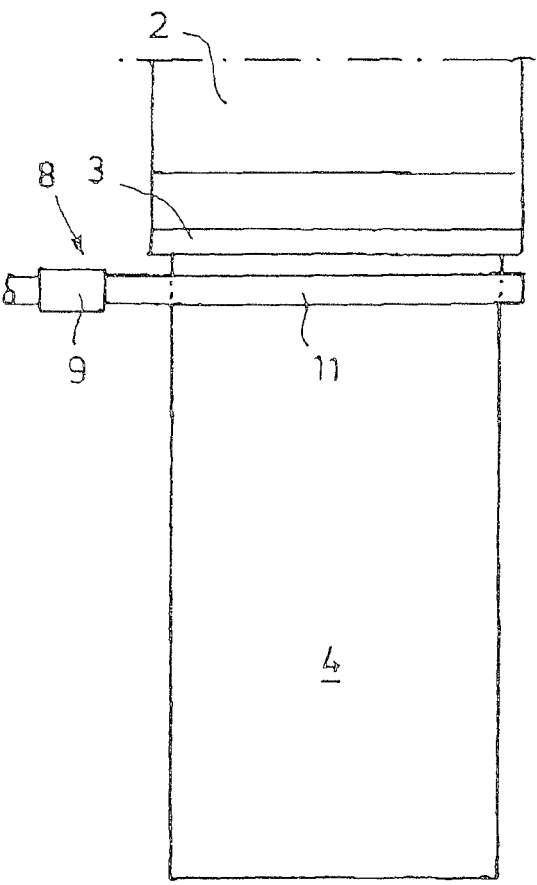
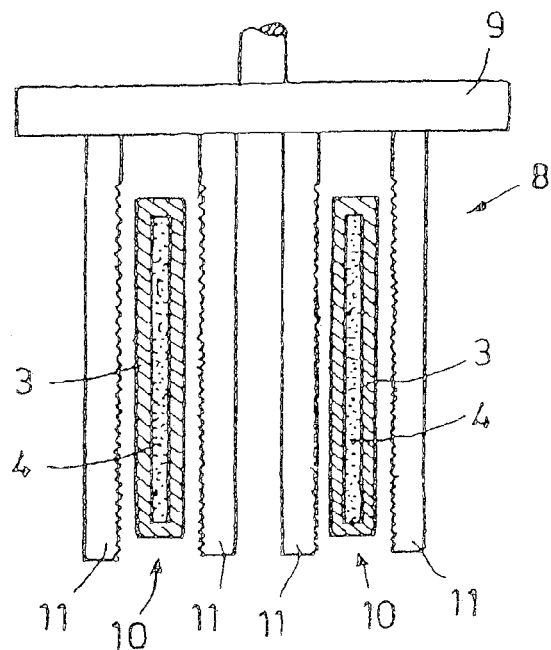
Fig.1
Fig.2
Fig.3

EXTRUSION BLOW MOLDING MACHINE AND METHOD FOR THE PRODUCTION OF A HOLLOW PLASTIC BODY

The invention relates to an extrusion blow machine and to a method for the production of a hollow plastic body, using such an extrusion blow molding machine.

Extrusion blow molding machines usually comprise one or more extruders for the plasticization of thermal plastic, at least one extrusion head for producing a tubular or sheet-like plastic preform and a molding die in which the plastic preform is expanded into a hollow body under differential pressure, that is to say by the action of a vacuum and/or gas pressure. The closed molding die comprises a cavity which defines the configuration of the finished article.

Either to the extrusion head may be arranged directly above the molding die or the molding die may be designed to be movable toward and away from the extrusion head.

Alternatively it is possible to take over the preform or preforms by means of known handling devices, for example by means tube grippers, on the extrusion head and to bring them to the molding die mounted fixedly next to the extrusion head or to transfer them there.

Extrusion blow molding is used predominantly to produce hollow bodies, such as, for example, bottles, shock absorbers, fuel oil tanks, casks and fuel tanks. In the case of large industrial components, such as, for example, fuel tanks for motor vehicles, fittings have to be provided in the components and are preferably introduced during the shaping of the hollow bodies. For this purpose, partly sheet-like preforms are shaped in the first heat into closed containers. To produce sheet-like preforms, the extrudate first produced in tubular form can be separated at diametrically opposite locations after emerging from the extrusion head and be spread out into stretched sheets by means of a handling device provided for this purpose. Alternatively, even inside the extrusion head, the tubular melt stream can be brought into a sheet-like configuration and be discharged via one or more sheet dies on the extrusion head. The advantage of this procedure is that there is no longer any need for a subsequent separation of the tube. It is known, for example, to apportion the tubular or tube-shaped melt stream inside the extrusion head to two sheet dies on an extrusion head. The benefit of this procedure in terms of process engineering is obvious. Within one extrusion cycle, two preforms which, for example, form two shells of a hollow body to be manufactured, are extruded. If the extrusion head is to be arranged directly above the molding die or the molding die is to be moved under the extrusion head in order to take over the preforms, the distance between the sheet dies must correspond at least to the center distance of the parting planes between the molding dies. Owing to this structural constraint, it is scarcely possible to convert an extrusion blow molding machine to another die at a justifiable outlay.

If the preforms are to be brought to the molding die, the manipulation of the preforms is relatively complicated.

EP 1 110 697 B1 discloses a method for the production of hollow bodies from plastic, in which likewise sheet-like preforms are extruded. To solve the problem described above, it is proposed there to provide below the extrusion head a roller guide device, by means of which the distance between the preforms is set to a desired value.

This design entails the disadvantage that the hot melt sheets may possibly become glued to the rollers of the guide device. This presents problems particularly when the extrusion is to be put into operation after a standstill.

The object on which the invention is based, therefore, is to improve an extrusion blow molding machine of the type initially mentioned, to the effect that the disadvantages described above are as far as possible avoided.

The object is achieved by means of an extrusion blow molding machine with at least one extruder, with at least one extrusion head, with at least two die gaps, arranged next to one another and designed in each case as sheet dies, for the extrusion of sheet-like plastic preforms, with a multipart molding die for processing two preforms into an essentially closed hollow body, and with a device for handling the preforms, comprising at least two grippers, arranged next to one another on a common carrier, for receiving the preforms, the distance between the grippers being variable.

By means of this arrangement, the distance between the preforms after take-over by the handling device can be made variable in an advantageous way, so that the die dimensions and the geometric constraints of the extrusion head are decoupled from one another.

Preferably, the handling device is movable and/or pivotable with respect to the extrusion head.

In an expedient variation of the extrusion blow molding machine according to the invention, there is provision for the grippers to comprise in each case two movable clamping jaws, between which a preform can be secured in each case.

By means of the handling device or by means of the grippers, the preforms can be broken off on the extrusion head. For this purpose, for example, it is known to extrude a thin place as a predetermined breaking line at a defined location on the preforms. Alternatively, a separating device for cutting off the preforms, after these have been secured between the clamping jaws of the grippers, may additionally be provided.

Expediently, the grippers are adjustable with respect to one another on the carrier from a first take-over position into a second transfer position, and vice versa. The grippers may, for example, be adjustable pneumatically or hydraulically on the carrier, specifically between limit stops provided for this purpose.

The object is achieved, furthermore, by means of a method for the production of a hollow plastic body, using an extrusion blow molding machine of the type described above, two sheet-like preforms being extruded simultaneously, with a given distance between them, to a specific length, the preforms being taken over, hanging on the extrusion head, by means of the grippers, and the preforms being transferred to an open, at least three-part blow molding die, the distance between the grippers before transfer to the molding die being adapted to the distance between the open parts of the die. The variation in the distance between the preforms may, for example, take place directly before transfer to the molding die, specifically in a pause in the movement of the handling device. Alternatively, it is also possible that the transport movement of the handling device and the relative movement of the grippers with respect to one another are superposed.

In a variant of the method according to the invention, the use of a molding die with two outer molds in each case forming part cavities and with one center mold is provided, the preforms being placed by means of the handling device in each case between an open outer mold and the center mold, and the distance between the grippers being set at least to the center distance of the parting planes between the outer molds and the center mold.

In a variant of the method according to the invention, there is provision for the molding dies to be arranged below the extrusion head in the extrusion direction and for the grippers to be moved in the extrusion direction after the take-over of the preforms, a transverse movement of the grippers being superposed upon this movement.

Alternatively, the molding die may be arranged next to the extrusion head or spatially at a distance from this, after the take-over of the preforms the grippers being moved jointly, at least transversely with respect to the extrusion direction, into the transfer position, and preferably the adjustment of the grippers with respect to one another being superposed upon the movement of the handling device.

Figure 5:
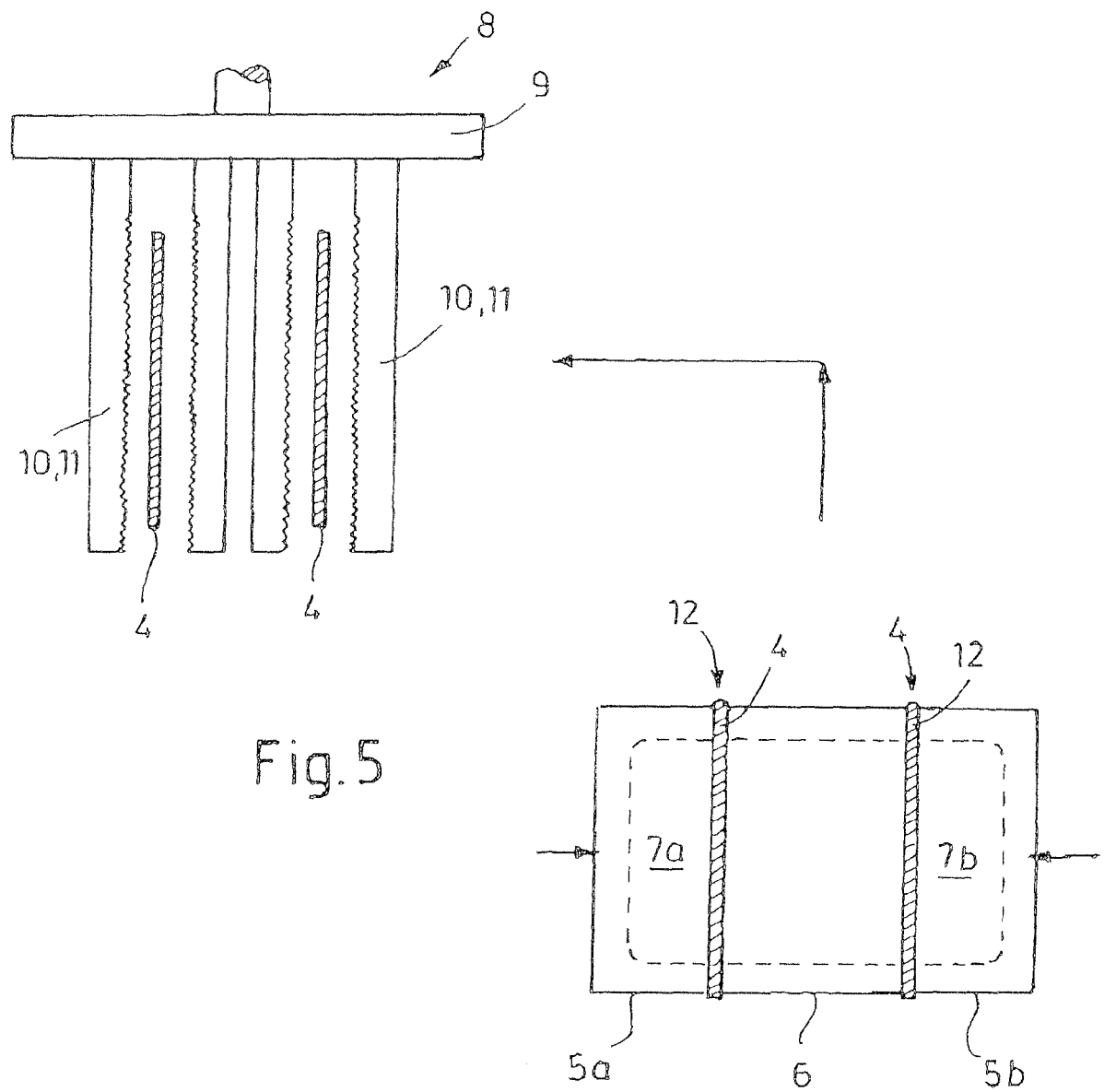
Figure 6:
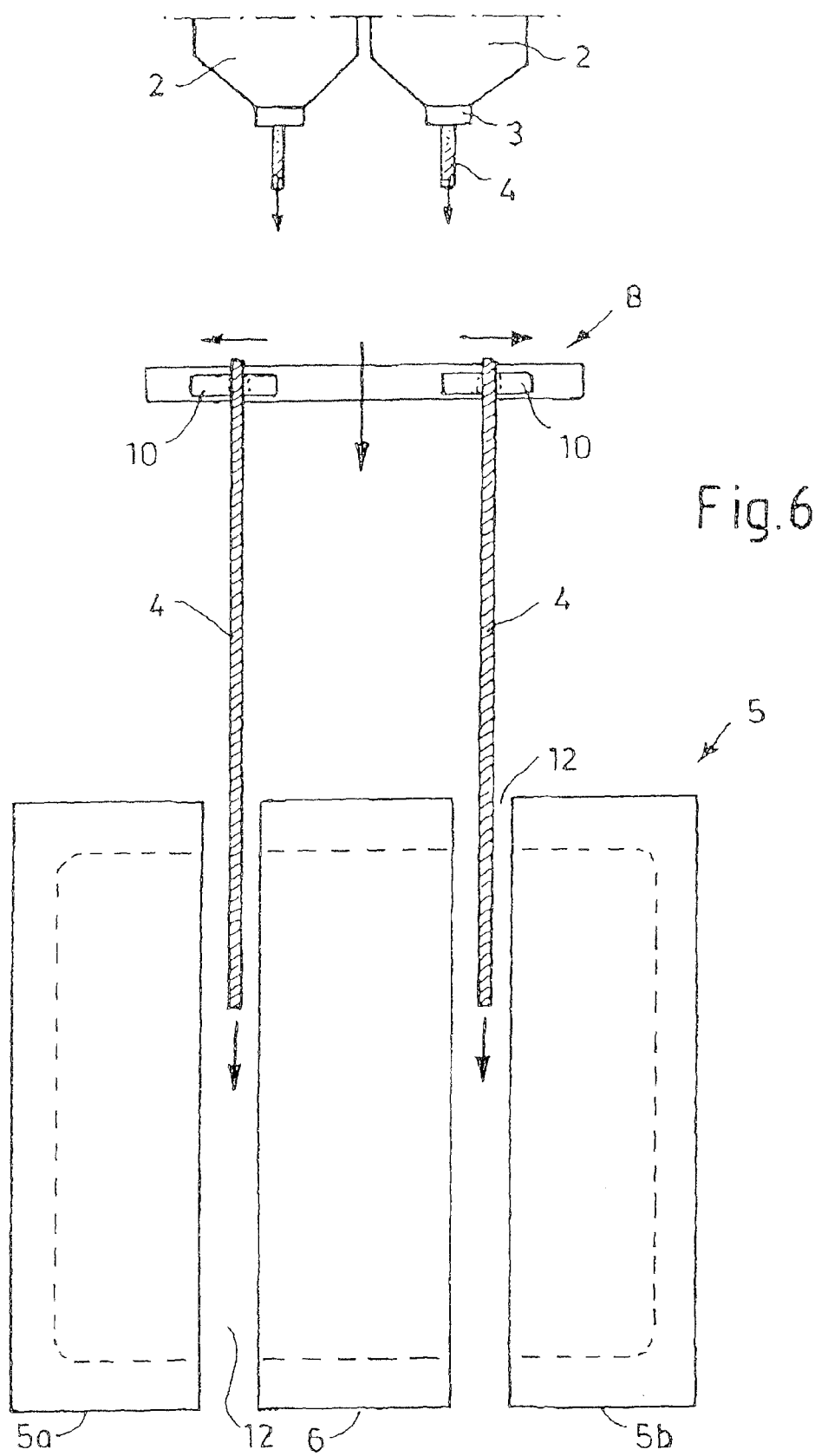

The invention will be explained below by means of two exemplary embodiments illustrated in the drawings in which:

FIG. 1 shows a view of an extrusion device with a device for handling the preforms according to the invention, FIG. 2 shows a view in the direction of the arrow II in FIG. 1, FIG. 3 shows a section along the lines III-III in FIG. 1, FIG. 4 shows a diagrammatic illustration of the movement sequence of the device for handling the preforms in the sectional plane IV-IV, FIG. 5 shows a diagrammatic view of the device for handling the preforms and of the molding die after the transfer of the preforms to the molding die and immediately before the take-over of two further preforms, and FIG. 6 shows a diagrammatic illustration of an alternative variant of the method according to the invention.

The extrusion blow molding machine 1 according to the invention is illustrated in greatly simplified form in the drawings. This comprises in a known way a plurality of extruders, not illustrated, for the melting and feeding of plastic granulate to an extrusion head 2, of which only the lower part with two die gaps designed as sheet dies 3 is illustrated in the figures.

Inside the extrusion head 2, the molten thermoplastic material, first distributed via one or more annular gaps concentrically arranged with respect to one another, is divided into two sheet-like or flannel-shaped melt streams which emerge as sheet-like preforms 4 from the sheet dies 3.

By virtue of their design, the sheet dies 3 are at a given distance from one another which is not necessarily selected such that the preforms 4 are already extruded in a die-compatible manner. The term "die-compatible" will also be explained below.

Moreover, the extrusion blow molding machine comprises a molding die 5 which, in the exemplary embodiment described, is of overall three-part design. The molding die 5 comprises two outer molds 5a, 5b and one center mold 6 which are movable away from one another and toward one another with the effect of an opening and closing movement, that is to say transversely with respect to the longitudinal extent of the preforms 4 which are extruded in the direction of gravity and, for example in FIG. 1, are illustrated as hanging on the extrusion head 2.

Each of the outer molds 5a, 5b forms a part cavity 7a, 7b which in each case defines the outer contour of part of the hollow body to be manufactured in the molding die 5.

After the extrusion of the preforms 4 to the desired length, these are introduced into the open molding die 5, as illustrated, for example, in FIG. 4. Inside the molding die 5, the preforms 4 are shaped by means of differential pressure (the action of a vacuum and/or gas pressure) in the outer molds 5a, 5b, after the molding die 5 has been closed, as illustrated merely by suggestion in FIG. 5.

The molding die 5 then opens again, and the center mold 6 is moved transversely with respect to the opening and closing direction of the outer molds 5a, 5b, so that the outer molds 5a, 5b can close, unimpeded, with respect to one another. In this case, the half shell-shaped parts of the finished container are welded to one another at a flange running around on the outside. After the opening of the outer molds 5a, 5b, the finished article can be removed, and the cycle recommences.

To handle the preforms 4, according to the invention a handling device 8 is provided which is designed as a double gripper. This comprises a carrier 9, on which are arranged in each case grippers 10 in each case with two movable clamping jaws 11 between which a preform can be secured in each case.

As illustrated in FIGS. 1 to 3, in the first method step of the production method the two preforms 4 are extruded to the desired length. In this case, for example, a wall thickness control of the sheet dies 3 may also be provided, such that each preform 4 is given an individual wall thickness profile.

After the complete extrusion of the preforms 4, these are secured in each case between the clamping jaws 11 of the grippers 10 (take-over of the preforms). The preforms 4 are then detached by means of a separating device, not illustrated, on the extrusion head 2. The handling device 8 can then introduce the preforms 4 into the open molding die 5 (FIG. 4). In the exemplary embodiment illustrated in FIG. 4, the molding die 5 is not arranged directly below the extrusion head 2, but instead laterally at a distance from this, so that the preforms 4 hanging on the handling device 8 are transported to the molding die 5 by means of the handling device 8.

In the position illustrated in FIG. 4, the preforms 4 are to be introduced into the molding die 5 in each case in the parting plane 12 between an outer mold 5a, 5b and the center mold 6. The position of the parting planes 12 depends primarily on the geometry of the article to be manufactured. This geometry can also be influenced by the width of the center mold 6 which serves, during the shaping of the shell-shaped semifinished products in the closed molding die 5, for attaching, via components holders, not illustrated, which can be moved out of the center mold, the fitting parts to the still hot-plastic inner wall of the article to be manufactured.

For decoupling the design-related distance between the sheet dies 3 and the position of the parting planes 12 and the molding die 5 with respect to one another, there is provision for the grippers 10 to be arranged on the carrier 9 at a variable distance which can be varied preferably during the transport movement of the handling device 8.

In the exemplary embodiments of the invention which are shown in FIGS. 1 to 5, the grippers 10 (pairs of clamping jaws) are moved apart after the take-over of the preforms 4, so that the distance between the preforms on the handling device is greater than the distance between the preforms 4 in their hanging arrangement on the extrusion head 2. It is obvious to a person skilled in the art that the opposite variant is possible, to be precise that the distance between the parting planes 12 of the molding die 5 is shorter than the distance between the sheet dies 3.

FIG. 4 illustrates diagrammatically the introduction of the preforms 4 into the molding die 5. After a transfer, the preforms 4 are held by the parts of the molding die 5, as illustrated in FIG. 5.

The handling device 8 is moved back into the take-over position, the grippers 10 being moved again to the initial distance between them.

FIG. 6 illustrates a variant of the extrusion blow molding machine according to the invention, in which the molding die 5 is arranged directly below the extrusion head 2. After the preforms 4 have been taken over by the handling device 8 or by the clamping jaws 11 of the grippers 10, the carrier 9 with the preforms located on it is moved only in the direction of weight. This movement has superposed upon it a transverse movement of the grippers 10 with respect to one another, that is to say transversely with respect to the extrusion direction or transversely with respect to the direction of weight, so that, ultimately, the distance between the preforms 4 is thus brought or set to the distance between the parting planes 12 of the molding die. After the preforms 4 have been taken over by the grippers 10, further preforms 4 are extruded simultaneously (continuous extrusion).

LIST OF REFERENCE SYMBOLS

1 Extrusion blow molding machine
2 Extrusion head
3 Sheet die
4 Preforms
5 Molding die
5*a*, 5*b* Outer molds
6 Center mold
7*a*, 7*b* Part cavities
8 Handling device
9 Carrier
10 Gripper
11 Clamping jaws
12 Parting planes

What is claimed is:

1. An extrusion blow molding machine with at least one extruder, with at least one extrusion head, with at least two die gaps, arranged next to one another and designed in each case as sheet dies, for the extrusion of sheet-like plastic preforms, with a multipart molding die for processing two preforms into an essentially closed hollow body, and with a device for handling the preforms, comprising at least two grippers, arranged next to one another on a common carrier, for receiving the preforms, the distance between the grippers being variable.

2. The extrusion blow molding machine as claimed in claim 1, characterized in that the handling device is movable and/or pivotable with respect to the extrusion head.

3. The extrusion blow molding machine as claimed in claim 1, characterized in that the grippers in each case comprise two movable clamping jaws, between which a preform can be secured in each case.

4. The extrusion blow molding machine as claimed in claim 1, characterized in that the grippers are adjustable with respect to one another on the carrier from a first take-over position into a second transfer position, and vice versa.

5. A method for the production of a hollow plastic body, using an extrusion blow molding machine as claimed in claim 1, two sheet-like preforms being extruded simultaneously, with a given distance between them, to a specific length, the preforms being taken over, hanging on the extrusion head, by means of the grippers, and the preforms being transferred to an open, at least three-part molding die, the distance between the grippers before transfer to the molding die being adapted to the distance between the parting planes of the molding die.

6. The method as claimed in claim 5, characterized by the use of a molding die with two outer molds in each case forming part cavities and with one center mold, the preforms being placed by means of the handling device in each case between an open outer mold and the center mold, and the distance between the grippers being set at least to the center distance of the parting plane between the outer molds and the center mold.

7. The method as claimed in claim 5, characterized in that the molding dies are arranged below the extrusion head in the extrusion direction, and in that the grippers are moved in the extrusion direction after the take-over of the preforms, a transverse movement of the grippers being superposed upon this movement.

8. The method as claimed in claim 5, characterized in that the molding die is arranged next to the extrusion head, and in that after the take-over of the preforms the grippers are moved jointly, at least transversely with respect to the extrusion direction, into the transfer position, preferably the adjustment of the grippers with respect to one another being superposed upon the movement.

* * * * *